United States Patent [19]
Manning

[11] Patent Number: 5,625,414
[45] Date of Patent: Apr. 29, 1997

[54] IMAGING DEVICE USING ASYMMETRICAL TIMING FOR PIXEL SUMMING

[75] Inventor: Thomas J. Manning, Canandaigua, N.Y.

[73] Assignee: Eastman Kodak Company, Rochester, N.Y.

[21] Appl. No.: 380,486

[22] Filed: Jan. 30, 1995

[51] Int. Cl.$^6$ .................................................. H04N 3/14
[52] U.S. Cl. ........................................ 348/312; 348/322
[58] Field of Search ................................ 348/312, 317, 348/320, 322; 257/239, 248, 249

[56] References Cited

U.S. PATENT DOCUMENTS

| | | | |
|---|---|---|---|
| 4,509,181 | 4/1985 | Sauer | 257/239 |
| 4,996,600 | 2/1991 | Nishida et al. | 348/322 |
| 5,272,535 | 12/1993 | Elabd | 348/322 |
| 5,396,121 | 3/1995 | Watanabe | 348/322 |
| 5,452,003 | 9/1995 | Chamberlain et al. | 348/294 |

*Primary Examiner*—Wendy Garber
*Attorney, Agent, or Firm*—David M. Woods

[57] ABSTRACT

A charge transfer imager useful for charge summing includes a photosensitive area for producing image charge, a floating diffusion for converting the image charge to a voltage, an output register for transferring the image charge to the floating diffusion, and an output circuit including the floating diffusion for producing an output signal that contains image information as a function of the difference between a predetermined reference level and an image level, both levels characterized by respective relatively constant pedestal regions. The imager is part of an imaging device that includes a clock generator for generating a reset signal of predetermined frequency that resets the voltage level of the floating diffusion, and for generating a transport signal that is applied to the output register for shifting the image charge to the floating diffusion at a multiple of the reset clock frequency. By modifying the symmetry of the transitions of the transport signal waveform that cause shifting of the image charge, an asymmetrical pattern of transition is obtained which accordingly affects charge transfer and widens the pedestal regions of the output signal, making them more suitable for subsequent sampling pulse placement.

20 Claims, 7 Drawing Sheets

NORMAL MODE CLOCKING

PIXEL SUMMING-SYMMETRICAL CLOCKS

PIXEL SUMMING-ASYMMETRICAL CLOCKS

RESET CLOCK (SHOWN FOR REFERENCE)

5,625,414

IMAGING DEVICE USING ASYMMETRICAL TIMING FOR PIXEL SUMMING

FIELD OF THE INVENTION

This invention pertains to timing techniques for outputting signals from a charge transfer imaging device, and in particular to timing techniques that provide pixel summing from a charge coupled device (CCD) imager.

BACKGROUND OF THE INVENTION

A charge transfer device such as a CCD imager includes a charge transfer section for transporting electric charge from an array of light sensitive pixel sites to an output circuit structure. The output structure employs a resettable floating diffusion that is used for charge to voltage conversion. This conversion generates an output signal that is typically processed with a sampling technique to measure the amplitude of the signal from each pixel site. For instance, correlated double sampling is commonly used in order to obtain low noise performance. Correlated double sampling is equivalent to subtracting a reset reference level from an image level for each output pixel from the CCD imager.

A CCD output circuit 2 and a subsequent sampling circuit 4, both known in the prior art, are shown in FIG. 1. The output circuit 2 converts a photoelectrically generated signal charge from a CCD imager 6 to an output voltage signal. The output circuit 2 is, for example, a floating diffusion amplifier structure formed on a common substrate with the imager 6. The sampling circuit 4 extracts the image information from the output signal. Charge packets from a photosensitive area comprising an array of imager photosites 8 are transferred through a transfer gate 9 into a horizontal output register 10. These charge packets are shifted horizontally to a floating diffusion output 12 via output gate 13 by horizontal transport clocks TRANSPORT-1 and TRANSPORT-2, each having waveforms with a pattern of transitions that cause shifting of the image charge. The potential of the floating diffusion 12, which changes linearly in proportion to the number of electrons in the charge packet, is applied to the input gate of a two stage source follower circuit 14, producing an output signal at $V_{out}$. A reset transistor 16 driven by a reset clock (RESET) recharges the floating diffusion 12 to the positive potential $V_{rd}$ before the arrival of each new charge packet from the horizontal output register 10.

FIG. 2 shows signal waveforms active in the circuits shown in FIG. 1, including the signal waveform $V_{out}$ at the output of the source follower 14. This waveform contains three components: the reset clock feedthrough ($V_{ft}$), the reset reference level ($V_{reset}$), and the image level ($V_{image}$). The reset and image levels can each be characterized as pedestals (reset pedestal and image pedestal) covering defined temporal regions within the waveform. The feed through $V_{ft}$ occurs as a result of capacitive coupling between the reset transistor 16 and the floating diffusion 12. When the floating diffusion 12 is reset, the exact reset voltage is affected by "thermal" noise, whose level depends on the capacitance of the floating diffusion 12 and the temperature. The same random reset noise voltage affects the level of both the reset level pedestal $V_{reset}$ and the image level pedestal $V_{image}$.

By taking the difference between samples of the pedestal levels of $V_{reset}$ and $V_{image}$ for each pixel, this "thermal" noise can be eliminated. This also reduces low frequency noise from the two stage source follower output amplifier 14. The signal $V_{out}$ from the source follower circuit 14 is applied to a clamp circuit 18, which clamps the reset level pedestal $V_{reset}$. The output of the clamp 18 and the signal $V_{out}$ are simultaneously applied to the sample/hold circuits 20 and 22, which respectively sample the reset level pedestal $V_{reset}$ (thus effecting a delay in the reset level pedestal) and the image level pedestal $V_{image}$. FIG. 2 shows the sampling waveforms CLAMP and SAMPLE that respectively drive the clamp circuit 18 and the sample/hold circuits 20 and 22. A noise-free difference signal, which is the image signal shown in FIG. 2, is taken between the outputs of the sample/hold circuits 20 and 22 by a subtracting circuit 24. A clock generator 26 provides the signals CLAMP and SAMPLE, as well as the transport clocks TRANSPORT-1 and TRANSPORT-2, and the reset clock RESET.

Pixel summing is based on reading out the charge data at ½ resolution of the CCD imager in ½ of the time. This is accomplished by adding charge together from two or more adjacent pixels at the output structure 2 of the imager 6. A known timing technique for pixel summing from two adjacent pixels, as shown in FIG. 3, involves doubling the clock rate of the symmetrical complimentary transport clocks TRANSPORT-1 and TRANSPORT-2 in relation to the clock RESET that resets the floating diffusion. One of the results of such doubling is that the output signal $V_{out}$ changes in profile reducing the pedestal length of both the reset level pedestal and the image level pedestal (compare the pedestals in FIG. 3 with those in FIG. 2). This change in profile may require changes in other system signal processing clocks such as the correlated double sampling clocks CLAMP and SAMPLE (see FIG. 2) to compensate for the narrower pedestal areas both in terms of pulse width and temporal position. Besides being difficult to accurately align the clamp and sample clocks to the narrower pedestals, the clock change required for such alignment can ultimately ripple through the timing of an entire data path and cause unwanted artifacts in the image signal.

SUMMARY OF THE INVENTION

Since the narrower pedestal areas, which may force a temporal adjustment of the correlated double sampling clocks and in turn force an adjustment of downstream signal processing clocks, relate back to the pattern of charge transfer provided by the symmetrical transport clocks, the invention proceeds from the realization that it might be possible to lengthen the pedestal areas by adjusting the symmetry of the transport clocks. Accordingly, it was found that the symmetry of the transport clocks can be adjusted within the span of the summed pixels to make the resultant output profile nearly identical to the non-pixel-summed output profile. Thus, by merely changing the transport clocks from a normal, symmetrical clocking mode to an asymmetrical pixel summing mode, no other clocks in the system need change and the aforementioned problems are avoided.

The object of the invention is therefore to overcome the temporal narrowing of the reset and image pedestals when pixel summing in the output structure of the imager by making the readout transport clocks asymmetrical.

A charge transfer imager useful for charge summing according to the invention includes a photosensitive area for producing image charge, a floating diffusion for converting the image charge to a voltage, an output register for transferring the image charge to the floating diffusion, and an output circuit including the floating diffusion for producing an output signal that contains image information as a function of the difference between a predetermined reference level and an image level, both levels characterized by respective relatively constant pedestal regions. The imager is part of an imaging device that includes a clock generator for generating a reset signal of predetermined frequency that resets the voltage level of the floating diffusion, and for generating a transport signal that is applied to the output register for shifting the image charge to the floating diffusion at a multiple of the reset clock frequency. By modifying the symmetry of the transitions of the transport signal waveform that cause shifting of the image charge, an asymmetrical pattern of transition is obtained which accordingly affects charge transfer and widens the pedestal regions of the output signal.

The advantageous effect of the invention is that the widened pedestal regions during charge summing make them more suitable for placement of the clamp and sample pulses. In particular, the same clamp and sample pulses used for normal charge transfer can be used for charge summing, without the risk that the clamp and sample pulses might extend into the output signal transitions between the respective pedestal regions. The added effort of repositioning the clamp and sample pulses for charge summing is therefore unnecessary.

BRIEF DESCRIPTION OF THE DRAWINGS

The invention will be described in relation to the drawings, in which.

DETAILED DESCRIPTION OF THE INVENTION

Figure 1:
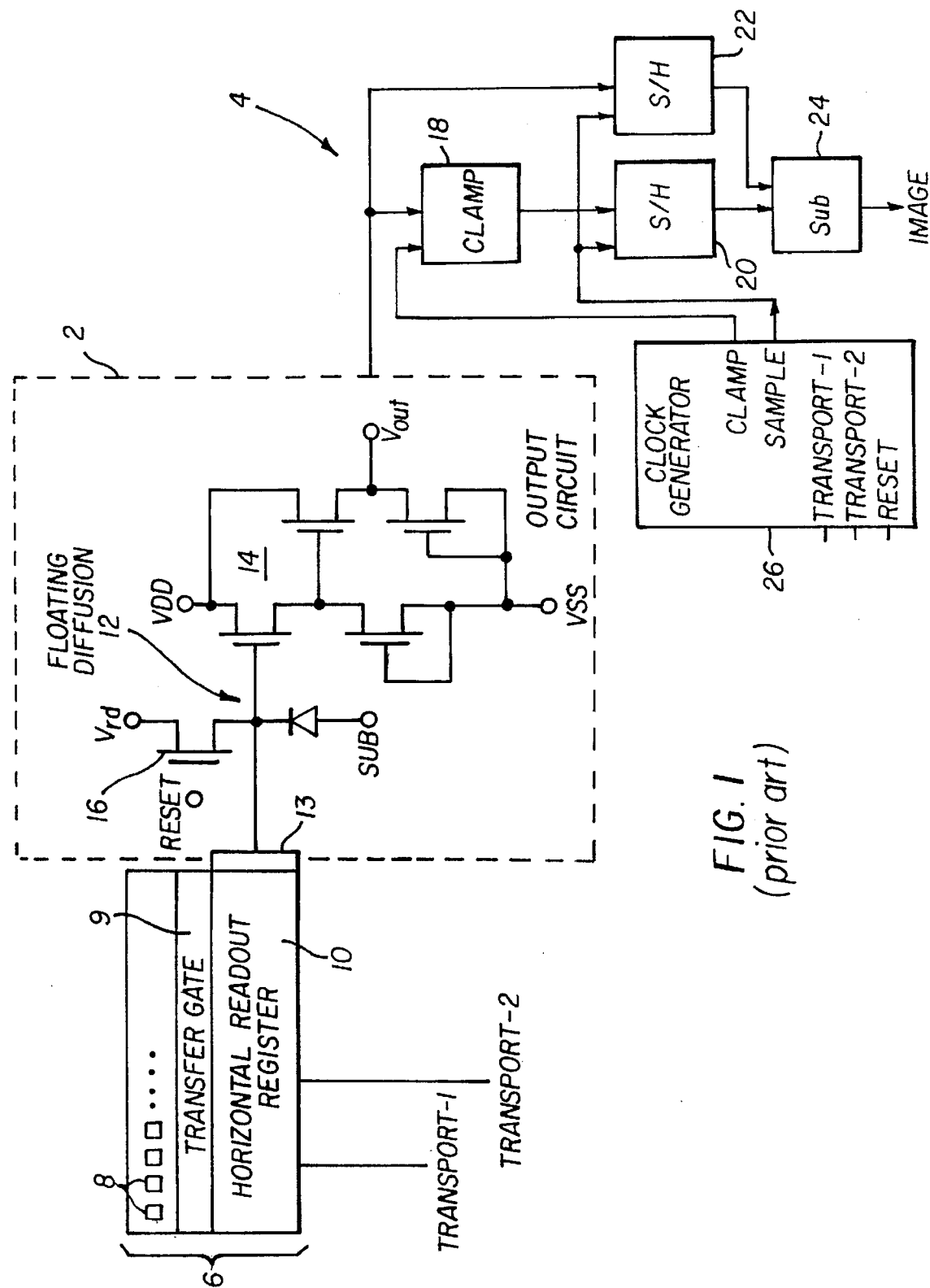
FIG. 1 shows a known output circuit for a charge transfer device connected to a known circuit for performing correlated double sampling of the output signal.
Figure 2:
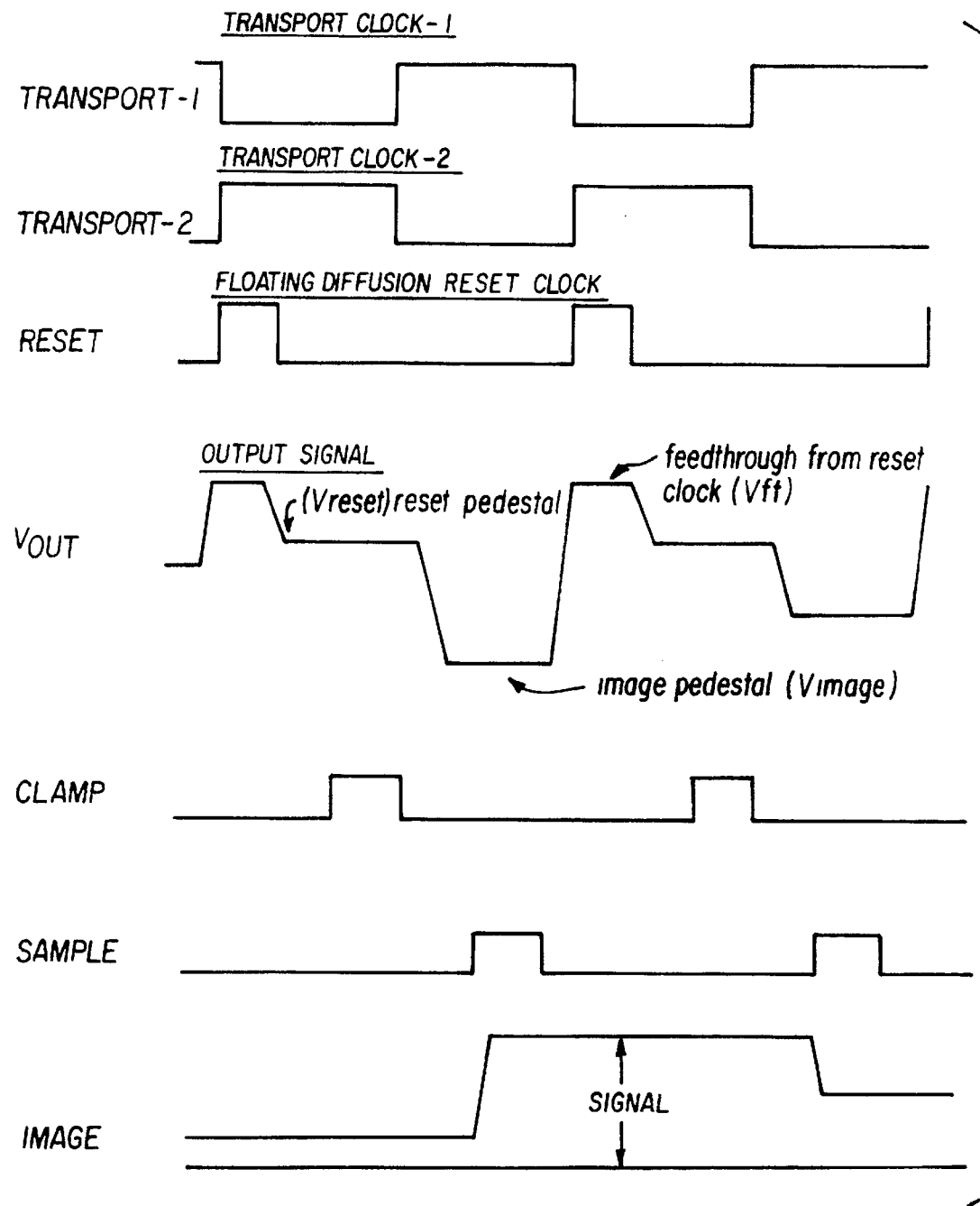
FIG. 2 shows the output signal waveform of the output circuit of FIG. 1 and the sampled output waveform of the correlated double sampling circuit of FIG. 1, as well as the clock signals used to drive these circuits.
Figure 3:
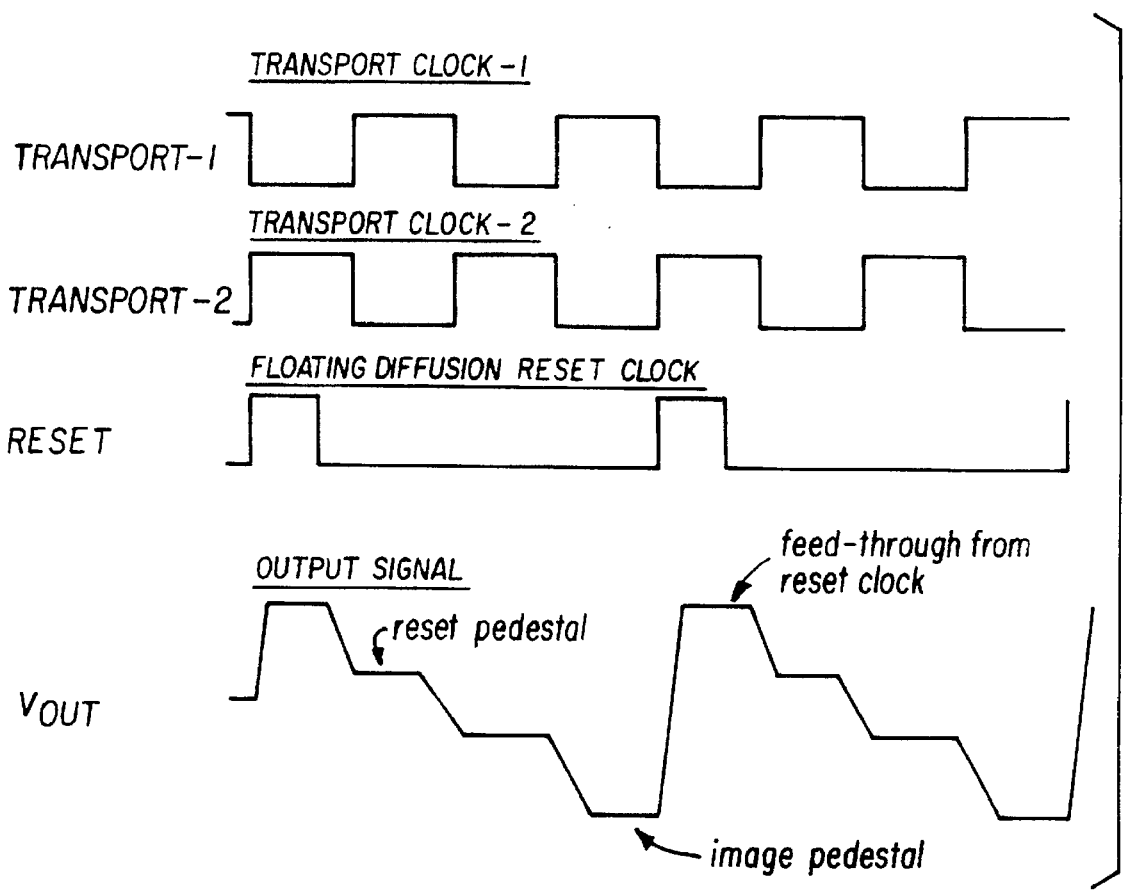
FIG. 3 shows waveforms of the symmetrical complementary transport clocks running at twice the reset clock rate to provide pixel summing in a known manner, as well as the resulting output waveform.
Figure 4:
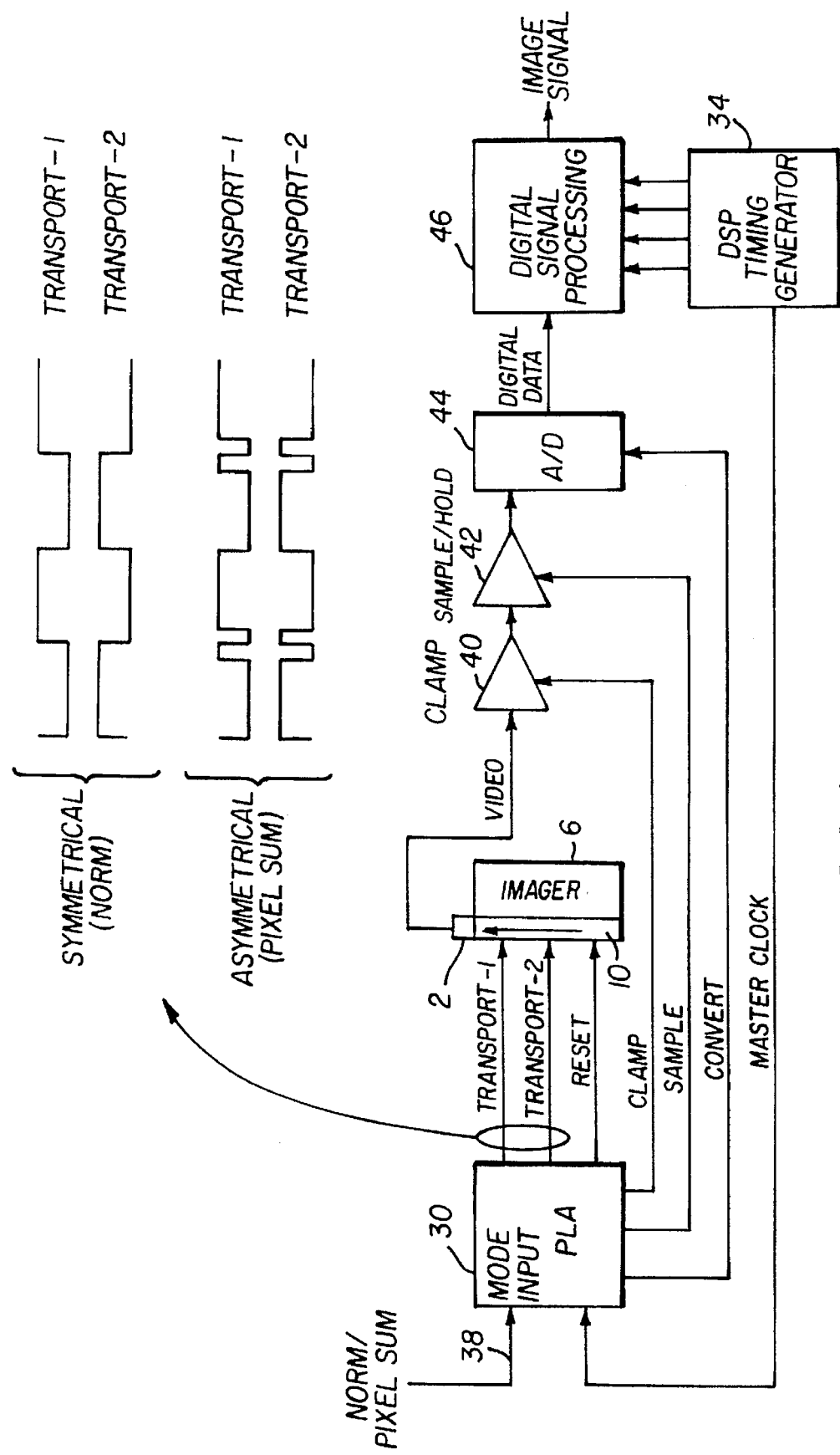
FIG. 4 is a block diagram of an imaging system using a CCD imager operable with asymmetrical clocks according to the invention.

Referring to FIG. 4, a charge transfer imaging system is shown employing a programmable logic array (PLA) 30 for generating the drive signals for a charge transfer imager, preferably the CCD imager 6. The imager 6 includes the horizontal output register 10 and the output circuit 2 (as shown in FIG. 1). The PLA 30 generates (a) a transport signal having a waveform with a pattern of negative- and positive-going transitions that cause shifting of the image charge from the output register 10 to the output structure 2 and (b) a reset signal for resetting the voltage of the floating diffusion 12 (as shown in FIG. 1) to a predetermined reference level. More particularly, the PLA 30 uses a synchronous master clock signal originating from a timing generator 34 to generate a transport signal comprising complementary horizontal transport clock signal waveforms (TRANSPORT-1 and TRANSPORT-2), as well as a reset signal waveform (RESET) for timing the transfer of charge from the horizontal output register 10.

The PLA 30 generates two types of transport waveforms: a waveform having a symmetrical pattern of transitions of the same frequency as the reset signal for transferring the charge from each pixel site 8 through the output structure 2, and a waveform having a frequency that is a multiple of the reset frequency and an asymmetrical pattern of transitions which accordingly affect charge transfer summing and widen, as will be shown, the pedestal regions of the output signal. (Symmetry, as understood herein, refers to the regularity, or the lack thereof, of the negative- and positive-going transitions of a particular, single waveform. For example, the symmetrical TRANSPORT-1 waveform shown in FIG. 4 has equally spaced transitions, while the asymmetrical TRANSPORT-1 waveform shown in FIG. 4 has unequally spaced transitions.)

An operator-triggered mode selection 38 (NORM/PIXEL SUM) to the PLA 30 determines the transport clock pattern that is to be generated, that is, a symmetrical pattern for normal (NORM) resolution transfer or an asymmetrical pattern for charge summing (PIXEL SUM) transfer. The output signal of the CCD imager 6 is applied to a reset clamp 40, which clamps to the reset pedestal level of the output signal, and to an image sample/hold 42, which samples the image pedestal level of the output signal. (These clamp and sample/hold operations function substantially as shown in connection with FIG. 1). The output of the sample/hold 42 is applied to an analog/digital (A/D) converter 44, which digitizes the values of the reset pedestal and the image pedestal. These digitized values are applied to a digital signal processing (DSP) circuit 46, which takes the difference between the two pedestal levels to arrive at the image signal.

Figure 5:
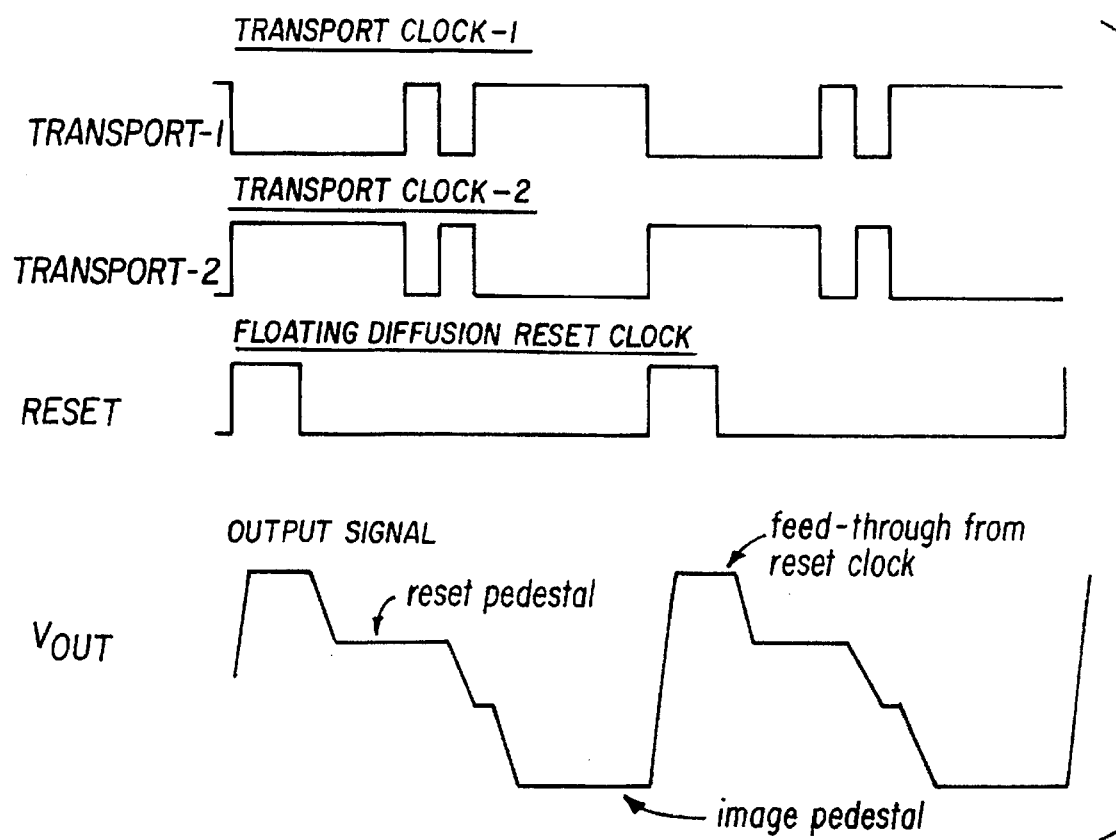
FIG. 5 shows waveforms of asymmetrical complementary transport clocks running at twice the reset clock rate to provide pixel summing according to the invention, as well as the resulting output signal waveform.
Figure 6:
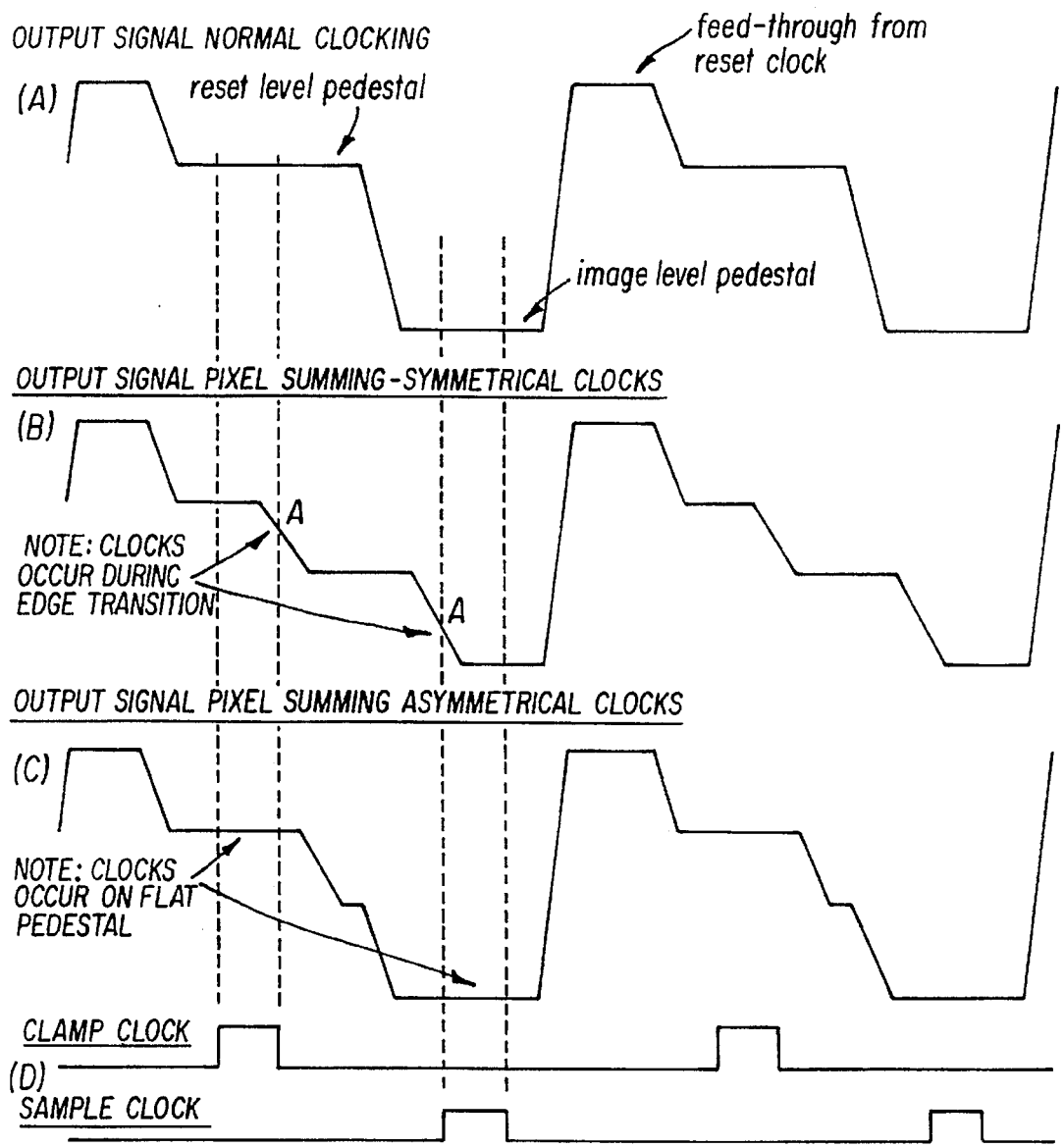
FIG. 6 shows the output signal obtained from (A) the normal clocking mode for normal full resolution imaging, (B) the symmetrical mode for pixel summing with symmetrical clocks, (C) the asymmetrical mode for pixel summing with asymmetrical clocks, and the relation of these modes to (D) the two correlated double sampling clocks.

The effect of the asymmetrical transport clocks upon charge transfer is illustrated in FIG. 5, which shows the asymmetrical complementary transport clocks running at twice the reset clock rate to effect pixel summing in the CCD imager 6. In particular, the symmetry of the waveform transitions of the transport clock waveforms TRANSPORT-1 and TRANSPORT-2 is sufficiently modified to enlarge the duration of both the reset level pedestal and the image level pedestal in the output signal $V_{out}$. The beneficial effect of this, in comparison to symmetrical pixel summing and to normal clocking, is seen in FIG. 6. In particular, as compared to normal clocking, the clamp and sample clocks for symmetrical clocking for pixel summing span the pedestal transitions of the output signal such that one transition of each clock occurs at point A during edge transition of the video signal between the reset level pedestal and the image level pedestal. This means the clamped and sampled signals are not totally confined to the respective reference levels, and the subsequent subtraction will not accurately reflect the charge packet due to the image. The conventional way around this problem is to temporally adjust the position of the clamp and sample clocks. In contrast, for asymmetrical clocking for pixel summing, the pedestal regions of the output signal are maintained substantially the same in both the normal and summing modes. Consequently, both transitions of each clock in each mode occur on the flat pedestal region of both the reset level pedestal and the image level pedestal. This avoids the necessity of realigning the clamp and sample clocks during pixel summing in order to prevent processing inaccuracy.

The PLA 30 also generates the CLAMP, SAMPLE, and CONVERT clocks for the reset clamp 40, the image sample/hold 42, and the A/D converter 44, respectively. Inasmuch as the clamp and sample clock pulses are always located within the respective pedestal regions, these clock pulse positions are functionally independent of the horizontal transport clocks (TRANSPORT-1 and TRANSPORT-2). Consequently, changing the horizontal transport clocks for normal imaging and pixel summing (i.e., between symmetrical and asymmetrical clock patterns) will not force temporal adjustment of the CLAMP, SAMPLE, and CONVERT clocks. Similarly, the resulting digitized data output from the A/D converter 44 will also remain constant with respect to the master clock (provided by the timing generator 34), despite changes in the transport clocks, and thus the timing for the DSP 46 will remain unchanged.

Figure 7:
FIG. 7 shows the relationship between the transport clocks in the normal mode and in the pixel summing mode with symmetrical and asymmetrical clocking, with the imager reset clock shown for reference.
Figure 7:
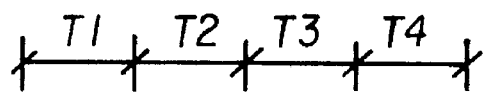
Figure 7:
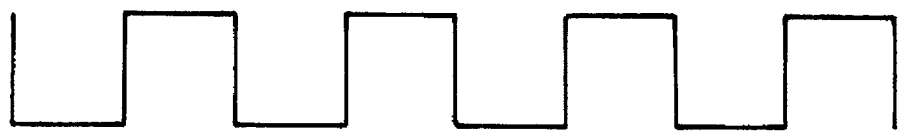
Figure 7:
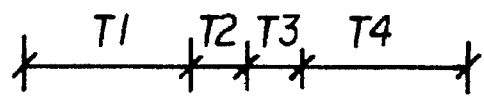
Figure 7:
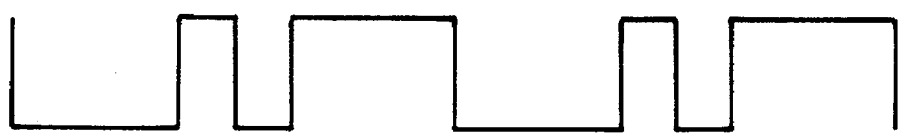
Figure 7:
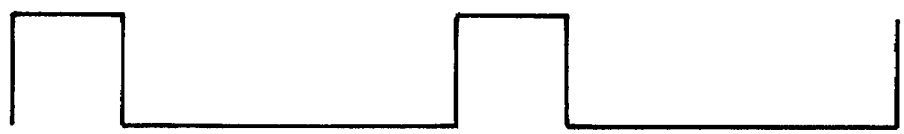

FIG. 7 shows the cyclical relationship maintained between the symmetrical and asymmetrical clocks so as not to change the image frequency. For the symmetrical clocks, waveform transitions are equally spaced and $$T1=T2=T3=T4$$

and the corresponding output image frequency is $$F_{image}=1/(T1+T2+T3+T4).$$

For the asymmetrical clocks, waveform transitions are unequally spaced such that $$T1'=T4, \text{ and } T2'=T3',$$

where $T2'_{min}=T3'_{min}=\frac{1}{2}[1/F_{image\ max}]$ (image max is defined as the maximum CCD transport clock rate as specified by the manufacturer.)

The corresponding output video frequency for the asymmetrical condition is $$F_{image}=1/(T1'+T2'+T3'+T4')$$

As seen in FIG. 7, if T1' and T4' are enlarged to the extent that T3' and T4' are diminished in the asymmetrical mode, the image frequency for the asymmetrical mode remains the same as for the normal, symmetrical mode.

The invention has been described with reference to a preferred embodiment. However, it will be appreciated that variations and modifications can be effected by a person of ordinary skill in the art without departing from the scope of the invention. For instance, while the preceding description has been directed to a 2X pixel summing system, the same methodology can be extended to multiple pixel summing operations (3X, 4X, etc.) Moreover, while the charge transfer imager has been shown in FIG. 1 as a linear imager, the benefits of the invention would also apply to an area-type imager.

PARTS LIST

2 CCD output circuit
4 sampling circuit
6 CCD imager
8 imager photosites
9 transfer gate
10 horizontal output register
12 floating diffusion output
14 source follower circuit
16 reset transistor
18 clamp circuit
20 sample/hold circuit
22 sample/hold circuit
24 subtracting circuit
26 clock generator
30 PLA
32 CCD imager
34 timing generator
36 horizontal readout register
38 mode input
40 reset clamp
42 image sample/hold
44 A/D converter
46 digital signal processing (DSP) circuit

I claim:

1. A charge transfer imaging device that performs charge summing upon image charge from adjacent pixels, said image charge being transferred from the device by a transport signal having a waveform with a pattern of transitions that cause shifting of the image charge, said imaging device comprising:

a charge transfer imager having a photosensitive area for producing image charge, a floating diffusion for converting the image charge to a voltage proportional to an image level, an output register for transferring the image charge to the floating diffusion, and an output circuit including the floating diffusion for producing an output signal waveform incorporating the voltage proportional to the image level, said waveform containing image information as a function of the difference between a predetermined reference level and the image level, both levels characterized by respective pedestal regions; and a clock generator for generating a) a reset signal of predetermined frequency that resets the voltage level of the floating diffusion to the predetermined reference level and b) the transport signal that is applied to the output register for shifting the image charge to the floating diffusion at a multiple of the reset clock frequency so that charge summing is effected at the output circuit, wherein the transitions of the transport signal waveform are characterized by an asymmetrical pattern which accordingly affects charge transfer so as to achieve charge summing.

2. A charge transfer imaging device as claimed in claim 1 further comprising a correlated sampling circuit including a clamp circuit for clamping to the predetermined reference level during its respective pedestal region and a sample/hold circuit for sampling the image level during its respective pedestal region, wherein the clock generator further generates a clamp clock waveform and a sample clock waveform for activating the clamp circuit and the sample/hold circuit, respectively, wherein the clamp and sample clock pulses occur wholly within the respective pedestal regions.

3. An charge transfer imaging device as claimed in claim 2 further comprising a processing section for generating an image signal from the difference between the outputs of the sample/hold circuit and the clamp circuit.

4. A charge transfer imaging device as claimed in claim 3 wherein the processing section comprises an analog to digital converter for converting the outputs of the sample/hold circuit and the clamp circuit to digitized image and reference levels, respectively, and a digital signal processor for differencing the digitized levels to provide a digitized image signal.

5. A charge transfer imaging device as claimed in claim 1 wherein the clock generator comprises a programmable logic array.

6. A charge transfer imaging device as claimed in claim 1 wherein the transport signal generated by the clock generator comprises complementary transport clock signals having twice the reset clock frequency so that charge summing from two adjacent pixels is effected at the output structure.

7. A charge transfer imaging device as claimed in claim 1 wherein the charge transfer imager is a charge coupled device.

8. A charge transfer imaging device as claimed in claim 1 wherein the charge transfer imager is a linear imaging device.

9. A charge transfer imaging device that operates in two modes in the generation of an output signal waveform, including a normal mode in which discrete image charge corresponding to each image pixel is used in the generation of the output signal waveform and a summing mode in which image charge from adjacent image pixels is combined in the generation of the output signal waveform, said image charge being transferred from the device by a transport signal having a waveform with a pattern of transitions that cause shifting of the image charge, said imaging device comprising:

a charge transfer imager having a photosensitive area for producing image charge, a floating diffusion for converting the image charge to a voltage proportional to an image level, an output register for transferring the image charge to the floating diffusion, and an output circuit including the floating diffusion for producing the output signal waveform incorporating the voltage proportional to the image level, said waveform containing image information as a function of the difference between a predetermined reference level and the image level, both levels characterized by respective pedestals covering temporal regions within the output signal waveform; and a clock generator for generating a) a reset signal of predetermined frequency that resets the voltage level of the floating diffusion to the predetermined reference level and b) the transport signal that is applied to the output register for shifting the image charge to the floating diffusion, said transport signal operable in the normal mode at the reset clock frequency so that signal conversion is effected at the output circuit for discrete charges and in the summing mode at a multiple of the reset clock frequency so that charge summing is effected at the output circuit, wherein the pattern of the transitions of the transport signal waveform are symmetrical in the normal mode to accordingly effect discrete charge conversion in the output circuit, and are asymmetrical in the summing mode to accordingly effect charge summation in the output circuit while maintaining temporal widths of the pedestal regions of the output signal substantially the same in both the normal and summing modes.

10. A charge transfer imaging device as claimed in claim 9 further comprising a correlated sampling circuit including a clamp circuit for clamping to the predetermined reference level during its respective pedestal region and a sample/hold circuit for sampling the image level during its respective pedestal region, wherein the clock generator further generates a clamp clock waveform and a sample clock waveform for activating the clamp circuit and the sample/hold circuit, respectively, wherein the clamp and sample clock pulses occur wholly within the respective pedestal regions.

11. A charge transfer imaging device as claimed in claim 10 further comprising a processing section for generating an image signal from the difference between the outputs of the sample/hold circuit and the clamp circuit.

12. A charge transfer imaging device as claimed in claim 11 wherein the processing section comprises an analog-to-digital converter for converting the outputs of the sample/hold circuit and the clamp circuit to digitized image and reference levels, respectively, and a digital signal processor for differencing the digitized levels to provide a digitized image signal.

13. A charge transfer imaging device as claimed in claim 9 wherein the clock generator comprises a programmable logic array.

14. A charge transfer imaging device as claimed in claim 9 wherein the transport signal generated by the clock generator comprises (a) complementary transport clock signals operable in the normal mode at the reset clock frequency and (b) complementary transport clock signals operable in the summing mode at twice the reset clock frequency so that charge summing from two adjacent pixels is effected at the output circuit.

15. A charge transfer imaging device as claimed in claim 9 wherein the charge transfer imager is a charge coupled device.

16. A charge transfer imaging device as claimed in claim 9 wherein the charge transfer imager is a linear imaging device.

17. A charge transfer imaging device as claimed in claim 13 wherein a selection input is provided to the programmable logic array for operator selection of normal or summing mode.

18. A method for transferring charge from a charge transfer imaging device that operates in two modes in the generation of an output signal waveform, including a normal mode in which discrete image charge corresponding to each image pixel is used in the generation of the output signal waveform and a summing mode in which image charge from adjacent image pixels is combined in the generation of the output signal waveform, said method comprising the steps of:

producing image charge in a photosensitive area of the charge transfer imager;

transferring the image charge through an output register to a floating diffusion;

converting the image charge at the floating diffusion to a voltage proportional to an image level;

generating a reset signal of predetermined reset clock frequency for resetting the voltage level of the floating diffusion to a reset reference level;

producing the output signal waveform from the charge conversion as a function of the difference between the reset reference level and the image level, both levels characterized by respective pedestals covering temporal regions within the output signal waveform;

generating a normal mode transport signal operable at the reset clock frequency for transferring the image charge so that signal conversion is effected in the charge conversion step for discrete image charges, and a summing mode transport signal operable at a multiple of the reset clock frequency so that charge summing is effected in the charge conversion step for adjacent image charges; and changing the pattern of the transitions of the transport signal waveform from a symmetrical pattern in the normal mode, to accordingly effect discrete charge conversion, to an asymmetrical pattern in the summing mode to accordingly effect charge summation in the charge conversion step while maintaining widths of the temporal pedestal regions of the output signal substantially the same in both the normal and summing modes.

19. The method as claimed in claim 18 further including the step of generating clamp and sample pulses for respectively clamping to the reset reference level during its pedestal region and sampling the image level during its pedestal region, whereby the maintaining of the pedestal regions during the summing mode assures that the clamp and sample pulses are wholly within the respective temporal pedestal regions.

20. The method as claimed in claim 19 further including the step of generating an image signal from the difference between the clamped reference level and the sampled image level.

* * * * *